(12) United States Patent
Komerath

(10) Patent No.: US 10,890,735 B2
(45) Date of Patent: Jan. 12, 2021

(54) ROTATIONALLY STABILIZED ATMOSPHERIC REFLECTOR TO REDUCE SOLAR IRRADIANCE

(71) Applicant: Narayanan Menon Komerath, Alpharetta, GA (US)

(72) Inventor: Narayanan Menon Komerath, Alpharetta, GA (US)

( * ) Notice: Subject to any disclaimer, the term of this patent is extended or adjusted under 35 U.S.C. 154(b) by 0 days.

(21) Appl. No.: 16/855,970

(22) Filed: Apr. 22, 2020

(65) Prior Publication Data
US 2020/0249427 A1    Aug. 6, 2020

Related U.S. Application Data

(62) Division of application No. 16/140,161, filed on Sep. 24, 2018, now Pat. No. 10,775,586.

(51) Int. Cl.
| | | |
|---|---|---|
| *B64C 39/10* | (2006.01) | |
| *G02B 7/182* | (2006.01) | |
| *B64C 39/02* | (2006.01) | |
| *B64B 1/58* | (2006.01) | |
| *B64D 27/24* | (2006.01) | |
| *B64C 27/08* | (2006.01) | |
| *B64B 1/44* | (2006.01) | |
| *B64F 1/10* | (2006.01) | |
| *A01G 15/00* | (2006.01) | |

(52) U.S. Cl.
CPC ............. *G02B 7/182* (2013.01); *A01G 15/00* (2013.01); *B64B 1/44* (2013.01); *B64B 1/58* (2013.01); *B64C 27/08* (2013.01); *B64C 39/02* (2013.01); *B64C 39/10* (2013.01); *B64D 27/24* (2013.01); *B64F 1/10* (2013.01); *B64C 2201/108* (2013.01)

(58) Field of Classification Search
CPC .................................................. B64C 2201/108
See application file for complete search history.

(56) References Cited

U.S. PATENT DOCUMENTS

| | | | | |
|---|---|---|---|---|
| 7,108,228 | B1 * | 9/2006 | Marshall | B64C 39/001 244/158.1 |
| 8,596,571 | B2 * | 12/2013 | Goelet | B64B 1/06 244/30 |
| 10,071,800 | B2 * | 9/2018 | Boros | B64C 1/24 |
| 2005/0230525 | A1 * | 10/2005 | Paterro | H02K 7/1823 244/23 B |
| 2008/0030884 | A1 * | 2/2008 | Hershkovitz | A01G 15/00 359/871 |
| 2008/0308685 | A1 * | 12/2008 | Decker | B64C 17/06 244/53 R |

* cited by examiner

*Primary Examiner* — Charlie Y Peng

(57) ABSTRACT

A method is described to stabilize a reflector in the upper atmosphere to reflect solar irradiance before it can be absorbed or scattered by Earth's atmosphere or surface. Thin reflective sheets are flown under control in the upper atmosphere above Earth, in contrast to reflecting from Space orbits or the ground. The high altitude enables nearly total reflection. This invention uses rotational motion to hold sheets stretched by centrifugal means while enabling the generation of aerodynamic lift. During the daytime solar power is used to store rotational and potential energy. During the night the low disc loading of the rotor system facilitates gliding flight without descending into controlled airspace.

1 Claim, 3 Drawing Sheets

US 10,890,735 B2

ROTATIONALLY STABILIZED ATMOSPHERIC REFLECTOR TO REDUCE SOLAR IRRADIANCE

PREAMBLE: REFERENCE TO PRIOR APPLICATION

This specification discloses and claims only subject matter disclosed in prior application Ser. No. 16/140,161, filed on Sep. 24, 2018 [2018-09-24]. The subject matter is directed to an invention that is independent and distinct from that claimed in the prior application, and names the inventor named in the prior application.

FIELD OF THE INVENTION

The primary field of application is to reduce Global Warming. The methods are related to air vehicles that are heavier than air under the atmospheric conditions where they are to be deployed. Specifically the methods relate to rotary-wing aerodynamic vehicles, designed and utilized for the purpose of reflecting sunlight.

Background of the Invention

Anthropogenic climate change is one of the most difficult problems facing humanity. The release of heat and heat-absorbing Green House Gases (GHG) into the atmosphere is causing the temperature at the Earth's surface to rise. The Intergovernmental Panel on Climate Change (IPCC) (Reference [1]) reports that Earth's atmosphere is retaining heat at a net rate of radiant forcing of 2.29 Watts per square meter of the Earth's surface. Normalized to the disc area of Earth seen by the Sun, this gives 9.16 Watts per square meter. This is compared to the nominal value of 1350 Watts per square meter of solar energy, called Air Mass Zero or AM0, falling on Earth's atmosphere. Island dwellers and people in low-lying coastal areas face rising sea levels because of the polar ice caps melting. Extreme weather events are already attributed to climate change. Prior proposed remedies are controversial because they detract from economic growth of nations or prevent the advancement of subsistence economies. Even if implemented, they will take a very long time

Prior Art

One way to control Global Warming is to reflect a part of the sunlight back into Space. Such a remedy has been proposed by several methods in prior art. These include reflectors or bubbles in Space [2-3], reflective particles or balloons released along with industrial exhaust and other aerosols [4-8], extracting carbon dioxide (CO2) from the atmosphere and ejecting purified air [9, 10] and wind turbines pumping Antarctic sea-water onto the edge of the ice-cap [11, 12]. Ground-based tiltable reflectors have been proposed [13], and US national laboratory researchers have proposed increasing the albedo of urban areas by mandating white paint on roofs and sidewalks [14, 15]. The above shows that the Prior Art consists of difficult methods that have proved to be impractical, harmful and ineffective. They are also not easily reversible once deployed, and their long-term effects cannot be predicted. The above also illustrate the extreme measures that have been proposed, implying huge expense and strong and varied concerns. None has to-date been adopted on a large scale.

SUMMARY OF THE INVENTION

Prior application Ser. No. 16/140,161 proposed and advanced a solution called the Glitter Belt. The solution is to float reflective sheets in the upper atmosphere, nominally in the region around 30,480 m (100,000 ft), using means that ensure that they will not sink below 18,288 m (60,000 ft, the edge of controlled airspace) in the night time. The reflectors are anticipated to be made of thin sheets with low areal density. They will have highly reflective upper surfaces, and the option of flat black lower surfaces. The former is to reflect sunlight in the daytime. The latter is to absorb radiation from Earth at night, so that most of it will then be transmitted by conduction to the upper surface and radiated out into Space. The concept is shown in FIG. 1 (repeated from Prior application Ser. No. 16/140,161), the reflectors being highly exaggerated to make them visible to the reader. High-altitude reflectors are far more effective compared to ones on the ground, while being several orders of magnitude less expensive than Space-based reflectors.

FIG. 2 is reproduced from Prior application Ser. No. 16/140,161 and represents one general implementation of the Glitter Belt. An architecture that is ultimately deployed, may use some combination of this with some other implementation.

FIG. 3 is the subject of the present invention. It shows an example of a rotary means for holding a thin reflective sheet stretched and stable in the atmosphere. This is called the Rotationally Stabilized Atmospheric Reflector. The particular example used to describe the invention is referred to as the "Quadrotor Beanie". It has four centrifugally stabilized reflector sheets with solar-powered rotors, generating enough aerodynamic lift to stay in position. It is noted here that the number four in the above is intended to convey an implementation which results in zero net angular momentum, and the ability to control attitude, position and speed of movement. Any variations that result in the same, using any number of rotors or aerodynamic surfaces added to rotors, are obvious variations of the above. Further implementations that combine this implementation with that claimed in the Prior application Ser. No. 16/140,161 are also anticipated.

BRIEF DESCRIPTION OF THE INVENTION

The Glitter Belt invention referenced to Prior application Ser. No. 16/140,161 is to place ultralight reflector sheets, not in orbit in Space, but near the edge of the atmosphere. Above 24 km (roughly 80,000 feet) altitude, the sky looks black from horizon to horizon even in bright sunlight. This is because there is not sufficient air to scatter the light and give the blue appearance seen below. With ultralight sheets, the aerodynamic loading, also known as the wing loading (defined as the weight supported per unit area of aerodynamic lifting surface) is so low that the sheet can fly like a wing, given sufficient speed.

The sheets can be equipped with sufficient structure and means for automatic guidance, navigation and control, so that they can fly in autonomous mode with only minor supervision from ground-based controllers. Over most of the planet, wind speeds and weather variations are small at such altitudes.

The advantages of the Glitter Belt concept compared to the Space-based reflectors of prior art, are several. The average speed required for the aerodynamic flight concept (Flying Leaf) is well under 10 m/s (ten meters per second), compared to the minimum speed required for low-earth orbit, which is approximately 7500 m/s. Since kinetic energy is proportional to the square of speed, a Space-based reflector would require 562,500 times the kinetic energy per unit area of reflector as the Glitter Belt. While orbiting spacecraft above 300 km altitude require very little power to stay in orbit for a long time, vehicles in the atmosphere need power addition to counter drag. However, sunlight provides plentiful and inexhaustible energy to power such vehicles. Unlike Space vehicles which incur high launch costs, the Glitter Belt vehicles can be launched from the ground almost anywhere on a clear morning, to climb to the required altitude. They can also be repositioned easily by aerodynamic flight, compared to the high expenditure of energy required to change the orbital plane of a spacecraft. Low flight speed keeps Glitter Belt vehicles localized over desired areas, posing much less risk to other traffic, than an equivalent number of vehicles moving at orbital speeds.

Figure 1:
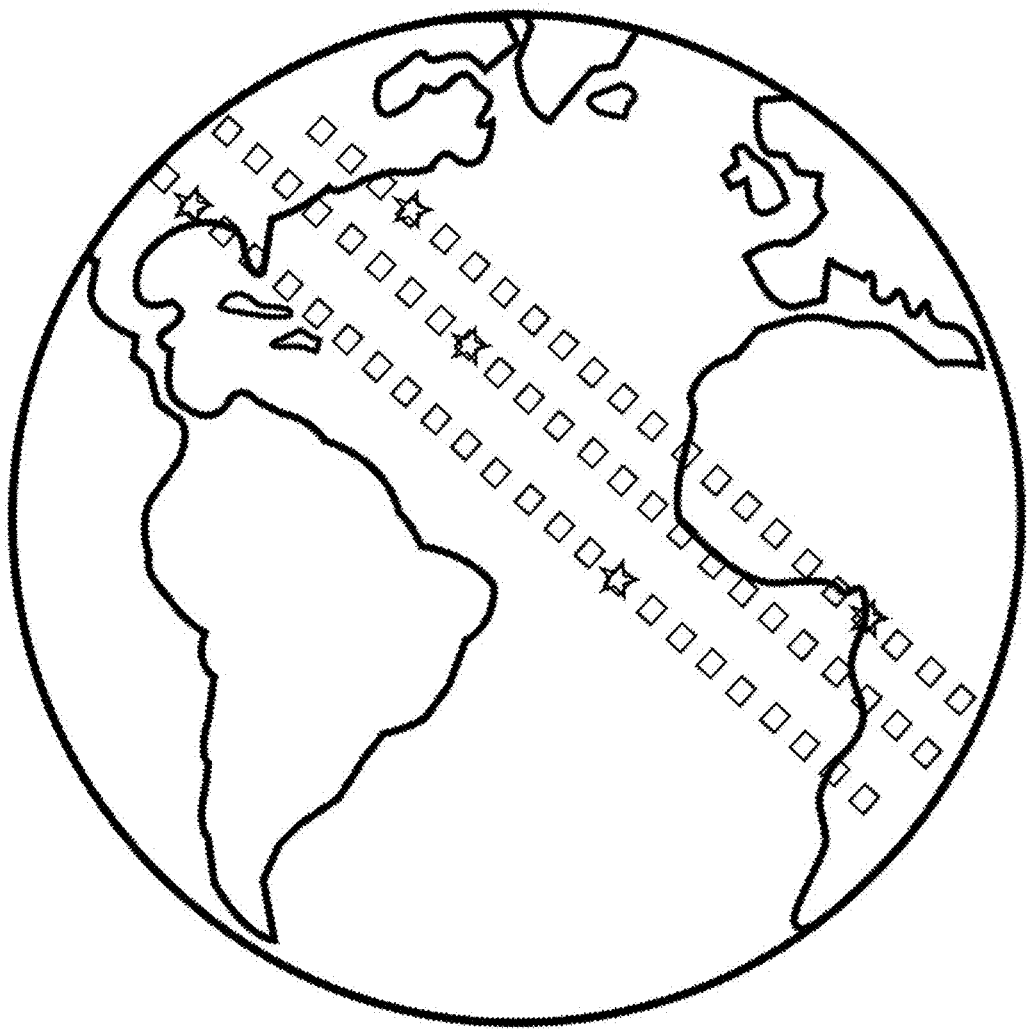
FIG. 1 shows an exaggerated illustration of the Glitter Belt concept. It shows an array of reflectors reflecting sunlight. Sizes of individual reflectors are highly exaggerated in the figure for clarity. In reality the individual sheets may not be visible except as points of light, from Space.

FIG. 1 is incorporated by reference from Prior application Ser. No. 16/140,161. It exaggerates the sizes of individual reflectors to illustrate the concept. Reflectors in the preferred embodiment of the invention will probably be concentrated in selected bands rather than being uniformly spread over the globe. In one implementation the bands are expected to follow the summer Sun and cross the Earth's Equator twice a year. However this is not essential.

Reflective sheets of aluminized Mylar, as an example, reflect nearly 100% of broadband sunlight. With the reflectors located at a nominal altitude, for instance near 30,480 meters (100,000 feet), almost all of the reflected radiation will exit permanently into Space. Higher or lower altitudes are also possible. In comparison, a ground-based reflector will only send about 50% of solar radiation back into Space, with most of the remaining 50% being absorbed in the lower atmosphere.

Thus, high-altitude reflectors are roughly twice as effective per unit area as ground-based reflectors. They do not need landowners' permission and can float above the oceans and icecaps as well. They are not affected by cloud cover and receive direct sunlight for more hours per day than ground-based reflectors. The ability to drift with the seasons to stay under the most intense summer sun, makes them even more efficient than ground-based reflectors.

Figure 2:
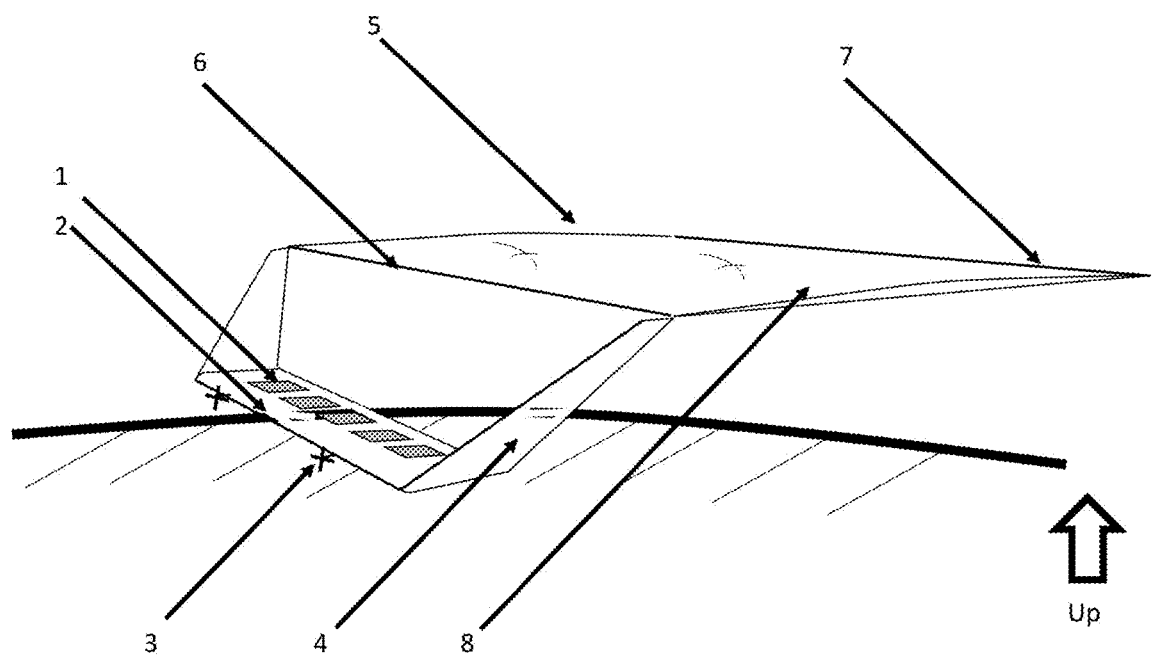
FIG. 2 is incorporated by reference from Prior application Ser. No. 16/140,161. It illustrates the Flying Leaf concept, an aerodynamically supported reflector. The Earth's horizon is shown as a thick curved line.

FIG. 2 is incorporated by reference from Prior application Ser. No. 16/140,161. It shows an aerodynamic means for supporting sheets in linear motion.

Quadrotor-Beanie: Centrifugally Stretched Aerodynamic Reflector System

Figure 3:
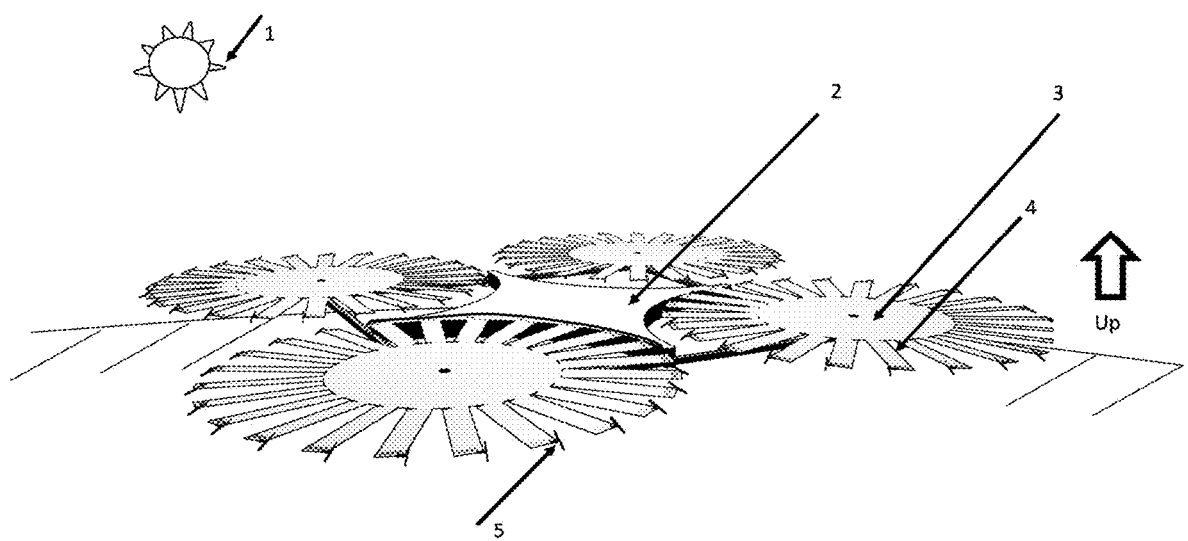
FIG. 3 illustrates one implementation of the Quadrotor Beanie concept, showing centrifugally stretched reflectors.

The subject of the present Invention is an implementation of a Glitter Belt element. This is the Rotationally Stabilized Atmospheric Reflector. In one example implementation it is a quad-rotor where each rotor consists of a slowly-spinning set of reflector blades at the edge of a large reflector-covered hub. This is shown in FIG. 3. Energy storage is by a combination of potential energy due to altitude rise, and rotational energy. The optional addition of tip-mounted batteries stores potential energy as chemical energy for use at night, as well as increased inertia to build additional rotational momentum in the daytime, to sustain rotation longer at night. The use of a quadrotor vehicle for horizontal motion is straightforward. It is most easily accomplished by tilting the vehicle axis. Variations with other numbers of rotors, or counter-rotating rotors on the same axis, are straightforward and obvious.

The Polar Necklace

The most urgent visible symptom of Climate Change is the breakup of the Antarctic Ice Shelves [16]. These are large sheets of ice formed by the flow from glaciers coming off the higher elevations of Antarctica. Large portions of these ice sheets are floating on the ocean. As ocean temperature increases the balance shifts between summer-time melting and winter ice accumulation, the sheets become thinner. Fractures appear. Large chunks drop into the ocean and float away to warmer parts of the ocean, and melt. Their melting raises the mean sea level. Thus, the problem is not so much the heating of the Antarctic plateau, but the rise in the ocean temperature bordering Antarctica. By decreasing summer sunlight on the ocean over a narrow strip above the coastline, the balance between summer melting and winter ice accumulation may be reduced enough to reverse the present trend. In prior art, Kawai [13] has suggested ground-based reflectors at polar latitudes to assist this; albeit at very high installation and maintenance costs. Ground-based reflectors must be installed on the solid coastal surface, and hence cannot reduce solar radiation on the sea ice. The present invention offers a scalable, automatic-controlled and remotely deployed solution. This appears to be superior to installing ground based reflectors in Antarctica. The installation of a ring of such upper atmosphere reflector arrays around the polar circle is named the Polar Necklace. As the Antarctic summer ends, the reflectors can be drifted and redeployed to follow the seasonal northwards or southwards drift of the summer Sun.

Semi-Annual Migration

The reflectors can be moved constantly to best reflect sunlight. Unlike birds that wait for late autumn and spring before undertaking long flights, the reflectors can be drifted slowly and continuously to track the midsummer Sun daily as the seasons change over the planet. The drift speed required is miniscule, well under 1 m/s according to calculations presented in [17] and [18]. Rotationally Stabilized Atmospheric Reflectors can achieve this result by edgewise flight in a manner that is similar to that of a frisbee toy or of a helicopter rotor in edgewise flight.

Need, Advantages, Feasibility and Differences Relative to Prior Art

Several references below describe prior art and basic knowledge that are applied in the new use described in the present invention.

Solar-powered aircraft in general are described in References [19] and [20]. These generally show that sufficient solar power can be absorbed during the daytime to enable a heavier-than-air aircraft to stay aloft in the atmosphere using aerodynamic lift.

U.S. Pat. No. 3,452,464[ Reference 21] describes a reflective Mylar sheet. Patent US 20140252156A1 [Reference 22] describes a High Altitude Aircraft, Aircraft Unit and Method for Operating an Aircraft Unit, generally similar to Reference [23] in design but incorporating thin Mylar sheets for covering the structure.

Technology that is relevant to the Glitter Belt architecture has been developed and presented by several researchers and inventors. References [24] and [25] describe the technology of solar sails. These promise to reduce the thickness and the areal density of the reflective sheets by orders of magnitude. Hence their future use is an obvious extension of the use of Mylar sheets.

Reference [26] defines the International Standard Atmosphere, used in calculations for the present invention. Reference [27] describes the performance achieved with the NASA Pathfinder aircraft. These vehicles incorporate chemical energy storage using fuel cells or batteries for night-time power generation to reduce the glide rate.

References [28] and [29] describe engineering aspects of aircraft that are intended for long-endurance flight in the upper atmosphere, including the use of solar-powered airplanes. These aspects are mostly included in the design of the Pathfinder and related aircraft. Again, the need for auxiliary energy storage forces these aircraft to have significantly higher wing loading than the Glitter Belt vehicles. By using the very large lifting surface area of the reflector sheets, the present invention achieves very low values of wing loading that cannot be approached by these prior endeavors.

Reference [30] presents experience from communications with a high-altitude solar-powered vehicle. This shows that remote operation of such vehicles has been studied, and is feasible. References [31], [32] and [33] discuss technical aspects of flying several aircraft or birds in close formation. Such flight has been used since the large bomber formations of World War II to increase range, while aerobatic exhibitions demonstrate extremely close formation flight even at very high speeds. Thus it is clear that formation flight in swarms, and communication with high-altitude swarms, are both solvable problems. Reference [34] describes the properties of the material used to make high-altitude balloons in the 1960s.

Marshall [35] described a round hydrogen-fueled spacecraft with solar panels covering the upper surface and propulsion jets located on the periphery. Said jets have axes nominally oriented perpendicularly to the vehicle planform, but may be tilted to other orientations. Solar Panels are not reflective but absorptive of solar energy. Boros [36] described a round-shaped heavy airborne transport device with a single large 4-bladed rotor above its non-rotating upper surface and four small propellers oriented with axis parallel to the axis of the main rotor, located one on each lateral side and two at the rear of the vehicle. While it superficially resembles a frisbee, the vehicle surface itself does not rotate: Lift is claimed to be generated by the suction induced by said rotor above the upper surface. Hence its operation is unlike that of a frisbee. Paterro [37] described a vehicle shaped like a flying saucer, that generates an electromagnetic field and teaches a plurality of peripheral quantum jet engines. The present device uses large reflective rotor blades with optional battery-powered propellers oriented with their axes being tangential to the tip path of the primary reflective rotor blades.

LIST OF REFERENCE TERM, NUMERALS AND SYMBOLS

| | |
|---|---|
| Planform Area | Area of lifting surface normal to plane formed by the chord and span. |
| Wing Loading | Total aircraft weight divided by planform area of lifting surfaces. |
| Disc Loading | Total aircraft weight divided by the area of the circle formed by rotors |
| 1 | Sun |

-continued

| | |
|---|---|
| 2 | Structure of Quadrotor with solar array including motors |
| 3 | Hub connecting motor, rotor and reflective sheet |
| 4 | Rotor blade with reflective upper surface |
| 5 | Battery-powered propellers at rotor tips |

Specific Example, Major Components and Alternatives

Example

Quadrotor Beanie

Referring to FIG. 3, the Quadrotor Beanie will start under solar power on a clear day and ascend to the desired altitude using its own rotor power. An alternative is to use one or more hydrogen balloon to accelerate the ascent. After the ascent the balloon may be returned to Earth. The sheet-covered framework structure (2) supports the four rotor motor pods and solar arrays (not shown in FIG. 3). The rotary motion of the hubs (3) is powered by electric motors that are powered by electrical energy from the aforementioned solar arrays. Once at altitude the rotors (4) which are attached to the hub and driven by solar-powered motor means, provide enough aerodynamic lift to keep the vehicle flying. The sheets covering the hub and rotor blades, reflect sunlight. The rotational angular momentum required to sustain flight of such a quadrotor is quite low, because of the low mass and high wing loading of the vehicle. Energy storage for use at night can be increased. The option of including small batteries with propellers at the tip of each rotor blade, is obvious and anticipated, as a means of increasing energy storage in the batteries, due to the increased inertia of the system. It is understood that several versions of this concept are possible, at different scales.

In one embodiment one or more electrical storage batteries will be mounted near the blade tip of each rotor. These will enhance night-time energy availability both from stored electrical energy, and from stored mechanical energy due to the higher rotational moment of inertia. Detailed studies will decide the merits of such an arrangement against the additional cost, structural and battery weight, and increased hazards.

By adjusting the rotational speed of each rotor, similarly to the control methods used for quad-rotor vehicles, various maneuvers are performed under automatic control.

The motion of the Quadrotor-Beanie could be combined with slow edgewise flight similar to that of a helicopter or gyroplane in autorotation in order to further enhance night-time energy storage and maneuvering ability.

A nominal 50 m diameter rotor as conceived for the initial embodiment, has 15 to 24 blades and a hub extending to 50% of the radius. These choices may be varied to suit the particular design constraints of a given implementation.

CONCLUSIONS

The Glitter Belt invention proves that at least one near-term solution exists, for the problem of Global Climate Change. It is possible to extend the system to the level that is required to reverse atmospheric heating back to desired levels. Such a large change will require a large number of reflectors to be deployed, over a period of 1 or two decades, with the participation of many nations around the world. Unlike prior concepts, the Glitter Belt is not known to cause any adverse effects. All the deployed systems may be removed from high altitude and the material recovered on demand. These aspects may be verified by actual testing which can proceed during the initial phase before significant expenditure of time or financial resources. In these respects and others, the Glitter Belt invention provides advantages superior to those of any prior proposals.

The Rotationally Stabilized Atmospheric Reflector is one generic way to implement a portion of the Glitter Belt. It combines aerodynamic rotary wing and fixed wing aircraft technology to generate aerodynamic lift. This lift supports the device in the upper atmosphere. The rotor and hub designs are optimized for high reflector area, as opposed to the usual emphasis on rotor efficiency. In the implementation shown, solar photovoltaic energy conversion is used to power the rotor system, as well as optional small propellers. Small batteries placed near the rotor tips serve dual purposes. They store energy in chemical potential form, to be released during the night to drive the propellers and hence keep the rotor turning through the night. They also add to the inertia of the system, storing mechanical energy during the daytime when solar power is abundant. The Quadrotor Beanie is presented as an example implementation of the Rotationally Stabilized Atmospheric Reflector.

REFERENCES

[1] Stocker, T. F. et al, (2013). Climate Change 2013: The Physical Science Basis. IPCC Working Group WG1 Contribution to The Assessment Report AR5 of the Intergovernmental Panel on Climate Change. Cambridge University Press. 1552p

[2] Early, J. T., "Space-Based Solar Shield To Offset Greenhouse Effect", Journal of the British Interplanetary Society, 42, pp. 567-569, 1989.

[3] Palti, Y., "Outer Space Sun Screen For Reducing Global Warming". Patent Application US 20080203328 A1, Aug. 28, 2008.

[4] Crutzen, P. J., Albedo enhancement by stratospheric sulfur injections: a contribution to resolve a policy dilemma? Climatic change. Springer, 77, 3, p. 211-220, 2006.

[5] Cody, C. A., "Method and devices to Control Global Warming". US Patent Application 20080203329 A1, Aug. 28, 2008.

[6] Chang, D. B., Shih, I. Fu, "Stratospheric Welsbach seeding for reduction of global warming". U.S. Pat. No. 5,003,186 A, Mar. 26, 1991.

[7] Neff, R., "Atmospheric injection of reflective aerosol for mitigating Global Warming". Patent Application US 20100127224 A1, Sep. 30, 2008.

[8] Jones, C. D., P. M. Cox, R. L. H. Essery, D. L. Roberts, and M. J. Woodage, Strong carbon cycle feedbacks in a climate model with interactive CO2 and sulphate aerosols, Geophysics Research Letters, 30, 1479, 2003.

[9] Eisenberger, P. and Chichilnisky, G., System and Method for Removing Carbon Dioxide From an Atmosphere and Global Thermostat Using the Same. U.S. Pat. No. 9,555,365B2, 2017-01-31.

[10] Teller, E., Hyde, R., Wood, L. Global Warming and Ice Ages: Prospects for Physics-Based Modulation of Global Change, 22nd International Seminar on Planetary Emergencies Erice (Sicily), Italy, August 1997. Also, Lawrence Livermore National Laboratory, UCRL-JC-128715, 1997.

[11] Frieler, K., Mengel, M., & Levermann, A. (2016). Delaying future sea-level rise by storing water in Antarctica. Earth System Dynamics, 7(1), 203.

[12] Grimm, R., Notz, D., Glud, R. N., Rysgaard, S., Six, K. D. Assessment of the sea-ice carbon pump: Insights from a three-dimensional ocean-sea-ice-biogeochemical model (MPIOM/HAMOCC). Elementa, 4, U. California Press, 2016.

[13] Kawai, K., "Solar Energy Reflection Plate For Suppressing Global Warming". US Patent Application 20110013271 A1, Jan. 20, 2011.

[14] Akbari, H., Menon, S., & Rosenfeld, A. (2009). Global cooling: increasing world-wide urban albedos to offset CO2. Climatic Change, 94(3), 275-286.

[15] Menon, S., Akbari, H., Mahanama, S., Sednev, I., & Levinson, R. (2010). Radiative forcing and temperature response to changes in urban albedos and associated CO2 offsets. Environmental Research Letters, 5(1), 014005.

[16] Scambos, T. A., Hulbe, C., Fahnestock, M., & Bohlander, J. (2000). The link between climate warming and break-up of ice shelves in the Antarctic Peninsula. Journal of Glaciology, 46(154), 516-530.

[17] Komerath, N., Hariharan, S., Shukla, D., Patel, S., Rajendran, V., and Hale, E., "The Flying Carpet: Aerodynamic High-Altitude Solar Reflector Design Study," SAE Technical Paper, SAE AeroTech Conference, Ft. Worth, Tex., Sep. 30, 2017.

[18] Shukla, D., Hariharan, S., Patel, S., Hiremath, N., Komerath, N., Tradeoff Study of High Altitude Reflector Concepts. Technical Paper, SAE AeroTech Conference, Ft. Worth, Tex., Sep. 30, 2017.

[19] Rawdon, B. K., Kutzmann, A. J., US Patent Application 20160144969 A1, May 26, 2016.

[20] Phillipps, W. H., "Solar Powered Aircraft". U.S. Pat. No. 4,415,133A, Nov. 15, 1983.

[21] Meyer, R., "Reflective Sheet". U.S. Pat. No. 3,452,464, September 1967.

[22] Hiebl, M., Pongratz, H. W., "High Altitude Aircraft, Aircraft Unit and Method for Operating an Aircraft Unit". Patent US20140252156A1 Sep. 11, 2014.

[23] Roach, K., "Double Layered Balloon Envelope." U.S. Pat. No. 9,475,567B1, Oct. 25, 2016.

[24] Lockett, Tiffany Russell, Alexander Few, and Richard Wilson. "Near Earth Asteroid Solar Sail Engineering Development Unit Test Program." 2017.

[25] Wright, J. L. "Space sailing." Taylor & Francis; 1992.

[26] Atmosphere, US Standard. "NOAA-S/T76-1562." Washington, D.C.: US Government Printing Office (1976).

[27] Flittie, K., & Curtin, B. (1998, August). Pathfinder solar-powered aircraft flight performance. In 23rd Atmospheric Flight Mechanics Conference (p. 4446).

[28] Romeo, G., Frulla, G., Cestino, E., & Corsino, G. (2004). HELIPLAT: design, aerodynamic, structural analysis of long-endurance solar-powered stratospheric platform. Journal of Aircraft, 41(6), 1505-1520.

[29] André, N. O. T. H. "Design of solar powered airplanes for continuous flight." PhD diss., ETH Zürich, 2008.

[30] Miura, R., Maruyama, M., Suzuki, M., Tsuji, H., Oodo, M., & Nishi, Y., Experiment of telecom/broadcasting mission using a high-altitude solar-powered aerial vehicle Pathfinder Plus. In Wireless Personal Multimedia Communications, 2002. IEEE 5th International Symposium, Vol. 2, pp. 469-473. October 2002.

[31] Lissaman, P. B. S., & Shollenberger, C. A. (1970). Formation flight of birds. Science, 168(3934), 1003-1005.

[32] Hummel, D. (1983). Aerodynamic aspects of formation flight in birds. Journal of theoretical biology, 104(3), 321-347.

[33] Blake, W., & Multhopp, D. (1998, August). Design, performance and modeling considerations for close formation flight. In 23rd Atmospheric Flight Mechanics Conference (p. 4343).

[34] Staugaitis, C. L., & Kobren, L. (1966). Mechanical And Physical Properties Of The Echo II Metal-Polymer Laminate (No. NASA-TN-D-3409). National Aeronautics And Space Administration Goddard Space Flight Center.

[35] Marshall, Manfred. Hydrogen-Fueled Spacecraft. U.S. Pat. No. 7,108,228 B1, Sep. 19, 2006.

[36] Boros, Jeddiya L. Heavy-Lift Airborne Transport Device. U.S. Pat. No. 10,071,800 B2, Sep. 11, 2018.

[37] Paterro, Von Friedrich C. Craft With Magnetically Curved Space. US Application US 2005/0230525 A1, Oct. 20, 2005.

The invention claimed is:

1. Method of locating a rotary wing vehicle with large reflective surfaces at high altitude for extended periods, consisting of:

using thin reflective sheets to cover a large portion of a vehicle planform means of holding said thin reflective sheets in tension using centrifugal stresses resulting from rotation to form the large reflective surfaces;

generating aerodynamic lift by aerodynamic rotor blades generally located at the periphery of the thin reflective sheets;

rotating said thin reflective sheets and rotors, by the use of motors and propellers, wherein the motors are powered by solar photovoltaic means;

cancelling torque from each motor by connecting said rotors in a quadrotor fashion, where adjacent rotors have opposite senses of rotation;

maneuvering by varying the thrust of each of the rotors independently;

generating additional aerodynamic lift by causing said rotary wing vehicle with the large reflective surfaces to move edgewise in a manner similar to that of a frisbee toy.

* * * * *